(12) United States Patent
Toyoshima

(10) Patent No.: US 8,472,474 B2
(45) Date of Patent: Jun. 25, 2013

(54) PACKET COMMUNICATION CONTROL DEVICE, A MEMORY ACCESS CONTROL DEVICE, AND AN INFORMATION-PROCESSING SYSTEM

(75) Inventor: Takashi Toyoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 12/967,597

(22) Filed: Dec. 14, 2010

(65) Prior Publication Data

US 2011/0158247 A1    Jun. 30, 2011

(30) Foreign Application Priority Data

Dec. 25, 2009   (JP) ................................. 2009-294281

(51) Int. Cl.
*H04J 3/16* (2006.01)

(52) U.S. Cl.
USPC ............................. 370/466; 370/535; 370/401

(58) Field of Classification Search
USPC ........................................................ 370/401
See application file for complete search history.

(56) References Cited

U.S. PATENT DOCUMENTS

| | | | | |
|---|---|---|---|---|
| 5,905,725 A * | 5/1999 | Sindhu et al. | ................. | 370/389 |
| 6,233,242 B1 * | 5/2001 | Mayer et al. | ................... | 370/412 |
| 6,320,859 B1 * | 11/2001 | Momirov | .................... | 370/395.1 |
| 6,345,345 B1 * | 2/2002 | Yu et al. | .......................... | 711/151 |
| 6,816,490 B1 * | 11/2004 | Chung | ............................ | 370/392 |
| 7,006,442 B1 * | 2/2006 | Abe et al. | ....................... | 370/236 |
| 7,409,462 B2 * | 8/2008 | Kuno | ............................... | 709/245 |
| 7,593,337 B2 * | 9/2009 | Oguchi et al. | ................. | 370/235 |
| 7,779,189 B2 * | 8/2010 | Dunn et al. | .................... | 710/113 |
| 7,814,280 B2 * | 10/2010 | Cummings et al. | ........... | 711/147 |
| 7,957,379 B2 * | 6/2011 | Minami et al. | ................. | 370/392 |
| 2006/0155938 A1 | 7/2006 | Cummings et al. | | |

FOREIGN PATENT DOCUMENTS

| | | |
|---|---|---|
| JP | 2002-182875 | 6/2002 |
| JP | 2008-245011 | 10/2008 |

OTHER PUBLICATIONS

European Search Report dated Nov. 9, 2011 issued in corresponding European Patent Application No. 10195977.3.

* cited by examiner

*Primary Examiner* — Ian N Moore
*Assistant Examiner* — Lakeram Jangbahadur
(74) *Attorney, Agent, or Firm* — Staas & Halsey LLP

(57) ABSTRACT

A packet communication control device transfers a control packet and a data packet and includes a plurality of sending units and a multiplexer which separates a data communication path and a control communication path, multiplexes the control packets and transfers the multiplexed control packets by the control communication path and the data packet by the data control path. The average Round Trip communication time can be shortened and the hardware cost can be reduced because the Shortest-Job-First control is implemented by separating data communication pathway from control communication pathway logistically or physically, and also multiplexing the control communication pathway with control packet.

15 Claims, 17 Drawing Sheets

PACKET COMMUNICATION CONTROL DEVICE, A MEMORY ACCESS CONTROL DEVICE, AND AN INFORMATION-PROCESSING SYSTEM

CROSS-REFERENCE TO RELATED APPLICATIONS

This application is based upon and claims the benefit of priority of the prior Japanese Patent Application No. 2009-294281, filed on Dec. 25, 2009, the entire contents of which are incorporated herein by reference.

FIELD

The embodiments discussed herein are related to a packet communication control device, a memory access control device, and an information-processing system.

BACK GROUND

When a plurality of devices communicate with each other, it is not advisable to secure a communication pathway assuming that all devices communicate at once. Because each device, in fact, do not communicate at all times. For example, if each device is communicating half of the time on average, it will be enough to secure the band in which the half of the actual devices can communicate concurrently.

In the packet communication illustrated in FIG. 16 and FIG. 17, for example, the Round Trip communication pattern, where a first device 100 sends a request to a second device 200, then the second device 200 responds to the first device 100, is used. The communication patterns include a data transmission request and a reception response illustrated in FIG. 16, and a reception request and a data transmission response illustrated in FIG. 17.

As illustrated in FIG. 16, the data transmission request (1) is a data transmission communication from the first device 100 to the second device 200. For examples, the Push-type data distribution or the Put-type transmission request is used. The reception response (2) is a receipt confirmation replication for the data transmission request (1) from the second device 200 to the first device 100.

Next, as illustrated in FIG. 17, the reception request (1) is the data reception request sent from the first device 100 to the second device 200. For examples, the Pull-type data distribution or the GET-type transmission request is used. The data transmission response (2) is the replication with the data transmission from the second device 200 to the first device 100.

In the above communications, the communication with data and the communication only with control information, not with data, are executed in pair. That is, the communication without data is a small packet only with control information of which the communication time is short, and the communication with data is the large packet which the long communication time is required. General communication may be categorized in these patterns. In such packet communication, the communication is not executed at all times, it is not needed to secure the communication pathway considering simultaneous communications among device.

On the other hand, in the communication not one-to-one basis as above but provided that 1:N (N is N>1 and is the whole number), N:1, and N:N, the requests of communication occur from multiple devices at a time. In this situation that the communication occurs simultaneously, the technology called "arbitration" or "scheduling" are implemented to control the communication order.

[Patent Document 1] Japanese Laid-open Patent Publication No. 2008-245011

[Patent Document 2] Japanese Laid-open Patent Publication No. 2002-182875

SUMMARY

The Shortest Job First technology by related arbitration or scheduling method can control the average responding time to the minimum. On the other hand, there lies the problem that the responding time in the worst condition cannot be promised. In order to control to guarantee the responding time of the latest time, the period of communication time needs to be predictable, and that is difficult.

Moreover, as for the hardware implementation, it is required to implement a complicated control which control to minimize the average response time while maintaining certain fairness and avoiding the situation of starvation. Therefore it is difficult to implement on the hardware.

According to an aspect of the invention, a packet communication control device which transfers a first control packet having control information when transferring the control information and a second control packet having the control information and a data packet having data when the data is attached to the control information via a communication pathway, includes a plurality of sending unit; and a multiplex control circuit which arbitrates sending requests from the plurality of sending unit and sequentially transfer the first and second control packets from the plurality of sending unit to a control communication pathway and transfer the data packet attached to the second control packet to the data communication pathway with synchronization to the transfer of the second control packet to the control communication pathway.

Further, according to the other aspect of the invention, a memory access control device which requests a memory access controller to access a memory by transferring the first control packet having control information when transferring the control information and the second control packet having the control information and a data packet having data when the data is attached to the control information via a communication pathway, includes a plurality of sending unit; and a multiplex control circuit which arbitrates sending requests from the plurality of sending unit and sequentially transfer the first and the second control packets from the plurality of sending unit to a control communication pathway and transfer the data packet attached to the second control packet to a data communication pathway with synchronization to the transfer of the second control packet to the control communication pathway.

Further, according to the other aspect of the invention, an information processing system include an arithmetic processing device, a memory, a memory access controller which accesses the memory, and a memory access execution device which requests the memory access controller to access a memory by transferring the first control packet having control information when transferring the control information and the second control packet having the control information and the data packet having data when the data is attached to the control information via a communication pathway. The memory access execution device includes a plurality of sending units; and a multiplex control circuit which arbitrates sending requests from the plurality of sending units and sequentially transfer the first and second control packet from the plurality of sending unit to a control communication pathway and transfer the data packet attached to the second control packet to a data communication pathway with synchronization to the transfer of the second control packet to the control communication pathway.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments will be explained below in the following order; an information processing system, a memory access execution circuit, a packet transmission circuit, a packet reception circuit, and the other embodiments, but the disclosed information processing system, the packet transmission circuit and the packet reception circuit are not limited to this embodiments.

(Information Processing System)

Figure 1:
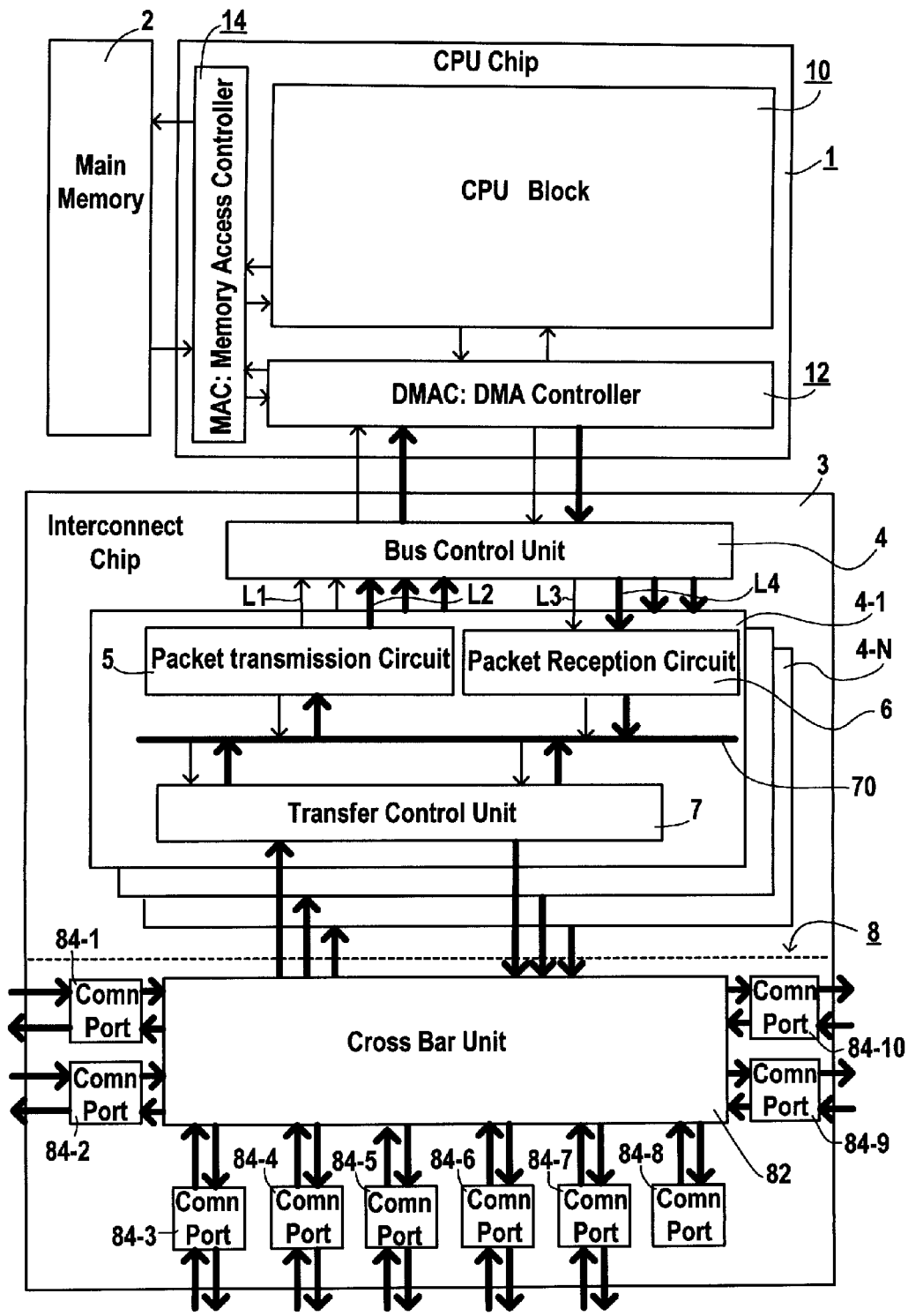
FIG. 1 is a configuration diagram of information processing system according to an embodiment of the invention.

FIG. 1 illustrates a configuration diagram of the information processing system according to an embodiment of the invention, and the information processing system illustrated in FIG. 1 is exampled as the system with CPU (Central Processing Unit) as an information processing device, a main memory, and an interconnect connection chip.

As illustrated in FIG. 1, the information processing system has a CPU chip 1 with a CPU block 10, a main memory 2, and a mutual interconnection network chip (called an interconnect chip) 3 with a memory access execution circuit. The CPU chip 1 has a CPU block 10 including a cache memory and CPU unit, a main memory access control circuit (MAC) 14 which controls access of the main memory 2, and a direct memory access controller (DMAC) 12 which controls DMA (Direct Memory Access).

The CPU block 10 accesses the main memory 2 through the main memory access control circuit 14. The DMAC 12 accesses the main memory 2 through the main memory access control circuit 14, according to the request from the memory access execution circuit based on the command by the CPU block 10, and the communication received from the other interconnect chips connected with communication ports 84-1 to 84-10, and accesses the cache memory built in the CPU block 10.

The interconnect chip (device) 3 with the memory access execution circuit has a bus control unit 4 connected to the DMAC 12, a plurality of memory access execution circuits 4-1 to 4-N connected to the bas control unit 4, and a switch unit 8. The bus controller unit 4 is connected to a plurality of memory access execution circuits 4-1 to 4-N, and executes bus arbitration, then executes the transmission and reception control between each memory access execution circuit 4-1 to 4-N and the DMAC 12.

Each of the memory access execution circuits 4-1 to 4-N is provided between the DMAC 12 of the CPU chip 1 and the switch unit 8. Each of the memory access execution circuits 4-1 to 4-N has a packet transmission circuit 5 which separates into a control packet and data packet and transmits separated packet to the DMAC 12 through the bus controller unit 4, a packet reception circuit 6 which receives the control packet and the data packet from the DMAC 12 through the bus controller unit 4, and a transfer control unit (a transmission/reception unit) 7 connected to the packet transmission circuit 5 and the packet reception circuit 6 through the bus 70.

The transfer control unit 7 reads the command sequence written by the CPU block 10 from the main memory 2, then generates the control packet and the data packet from the command included in the command sequence, and sends them to the packet transmission circuit 5, and also receives the reception packet from the packet reception circuit 6.

The transfer control unit 7 controls to transfer the transferring data to/from the switch unit 8. The switch unit 8 includes a cross bar unit 82 and a plurality of communication ports 84-1 to 84-10. Other cross bar switches and external devices are connected to these communication ports 84-1 to 84-10.

Also, the packet reception circuit 6 is provided to the DMAC 12 of the CPU chip 1 in order to transmit the packet with the packet transmission circuit 5 of the memory access execution circuit 4-1 to 4-N. Likewise, the packet transmission circuit 5 is provided to the DMAC 12 of the CPU chip 1 in order to transmit the packet with the packet reception circuit 6 of the memory access execution circuit 4-1 to 4-N. The explanation will be omitted as it is same as the configuration of the memory access execution circuits 4-1 to 4-N.

In this configuration, the CPU block 10, along with processing, writes the command to the main memory 2 and generates series of commands. The transfer control unit 7 generates the control packet, then accesses the main memory 2 through the packet transmission circuit 5 from the DMAC 12, and reads the series of commands from the main memory 2 as data. The transmission control unit 7 receives and stores series of commands read out from the packet reception circuit 6 through the bus 70.

Then, the transfer control unit 7 takes out the command from series of commands, generates the control packet and/or the data packet from the command, then transmits the packet to the packet transmission circuit 5 through the bus 70. On the other hand, the transfer control unit 7 receives the store data through the communication ports 84-1 to 84-10 and the cross bar switch 82, generates store data packet, and then transmits the packet to the transmission circuit 5. Also, the transfer control unit 7 transmits the received data to other interconnection network chips and external devices through the crossbar switch 82 and communication ports 84-1 to 84-10.

In this configuration, the memory access execution circuit 4-1 accesses the main memory 2, stores data from a plurality of ports, and transmits the data to a plurality of ports according to the command from the CPU block 10. The memory access execution circuit 4-1 executes series of DMA operation. As the memory access execution circuit 4-1 executes the DMA operation and communicates with the external devices by the command of the CPU block 10, traffic volume needs to be high. So it is need that using of the buses L1 to L4 be effective and the average delay time be minimized.

(Memory Access Execution Circuit)

Figure 2:
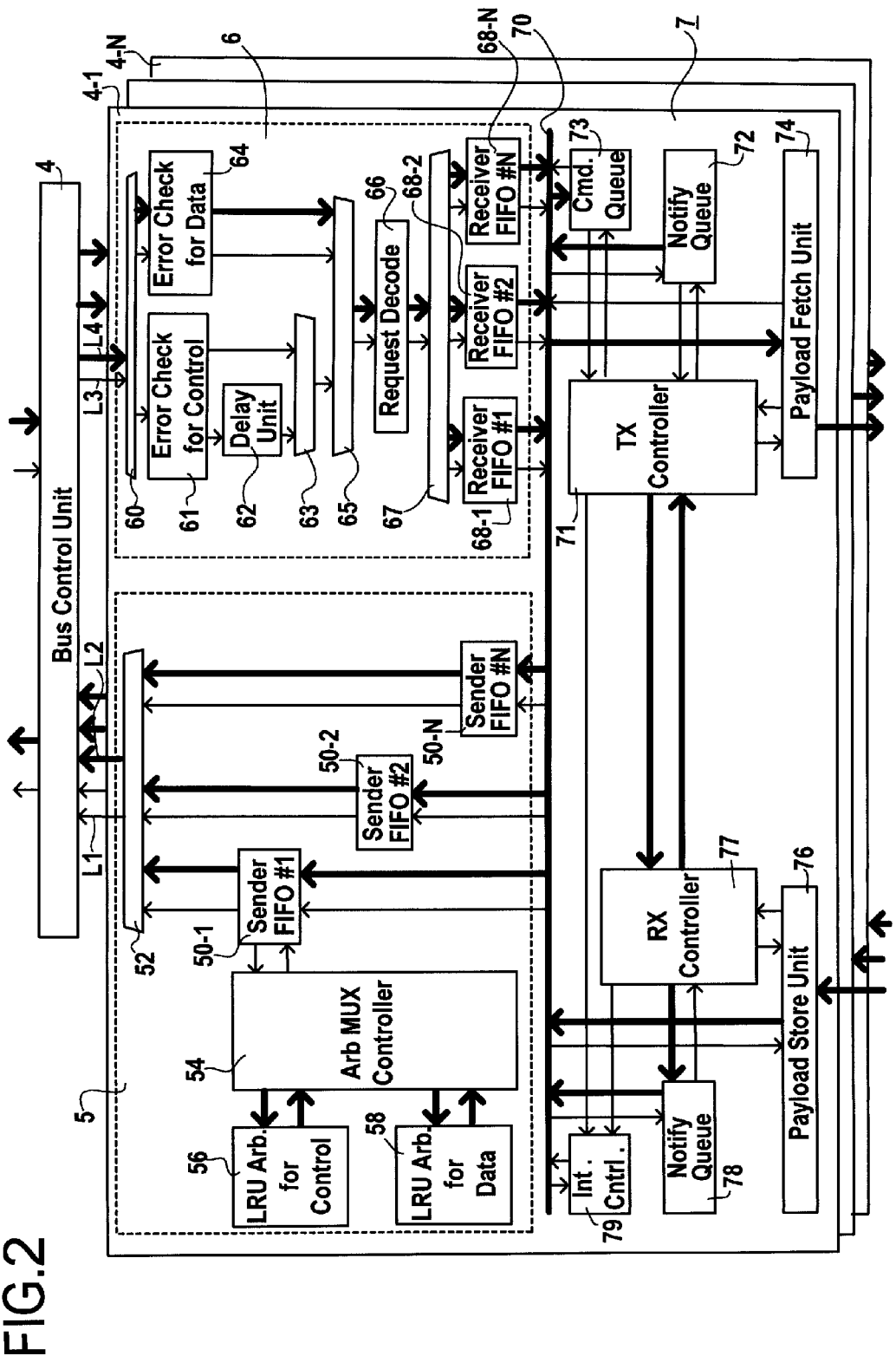
FIG. 2 is a block diagram of the memory access prosecution circuit in FIG. 1.

FIG. 2 illustrates the configuration diagram of the memory access execution circuit in FIG. 1. And FIG. 3 to FIG. 6 illustrate the explanatory diagrams of an example of the communication. Here, as communication packet, the packet which has only the control information is prescribed as the control packet, and the packet having data is prescribed as the data packet. Hereinafter, the explanation is made using the examples of fetching of data from the main memory 2 and storing of data to the main memory 2, but it does not limit to the packet communication towards the main memory.

Figure 3:
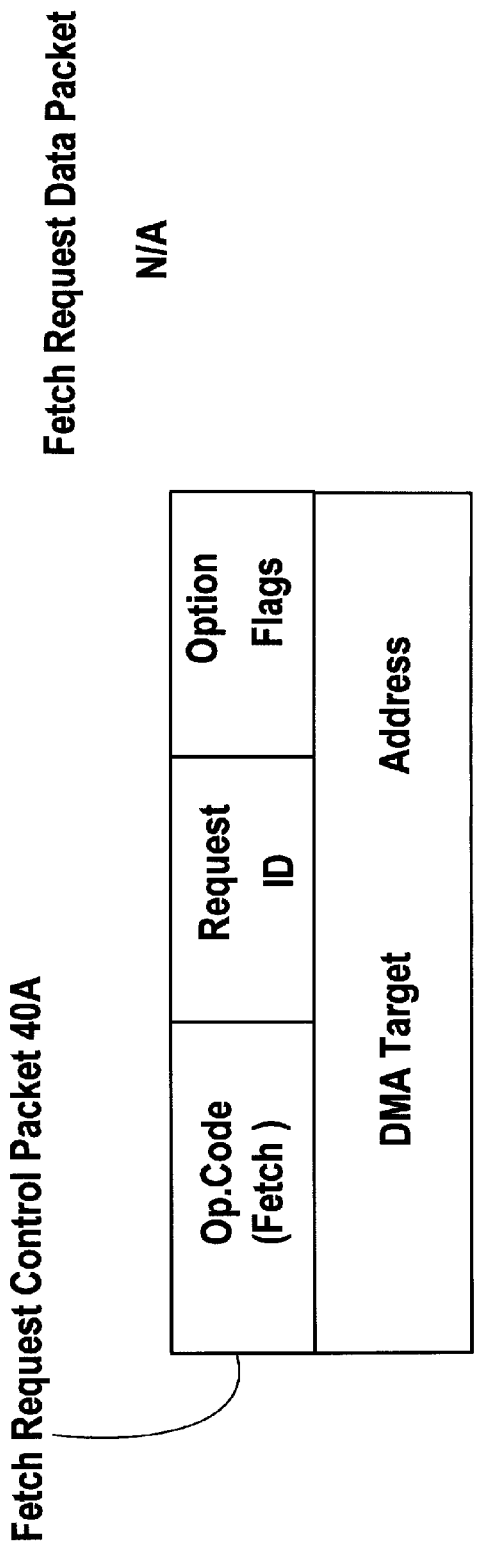
FIG. 3 is an explanatory diagram of reception request packet in the embodiment of the present invention.

Firstly the communication packet created by the transfer control unit 7 is explained with FIG. 3 to FIG. 6. In the fetch operation, the requestor sends the fetch request to the DMAC 12, and then obtains fetch response and data from the DMAC 12. As illustrated in FIG. 3, the fetch request has the fetch request control packet 40A. And the fetch request control packet 40A has the Operation Code (Op Code)=Fetch, the request ID (Identifier), the option flag, and the DMA target address. The fetch request does not have data packet.

Figure 4:
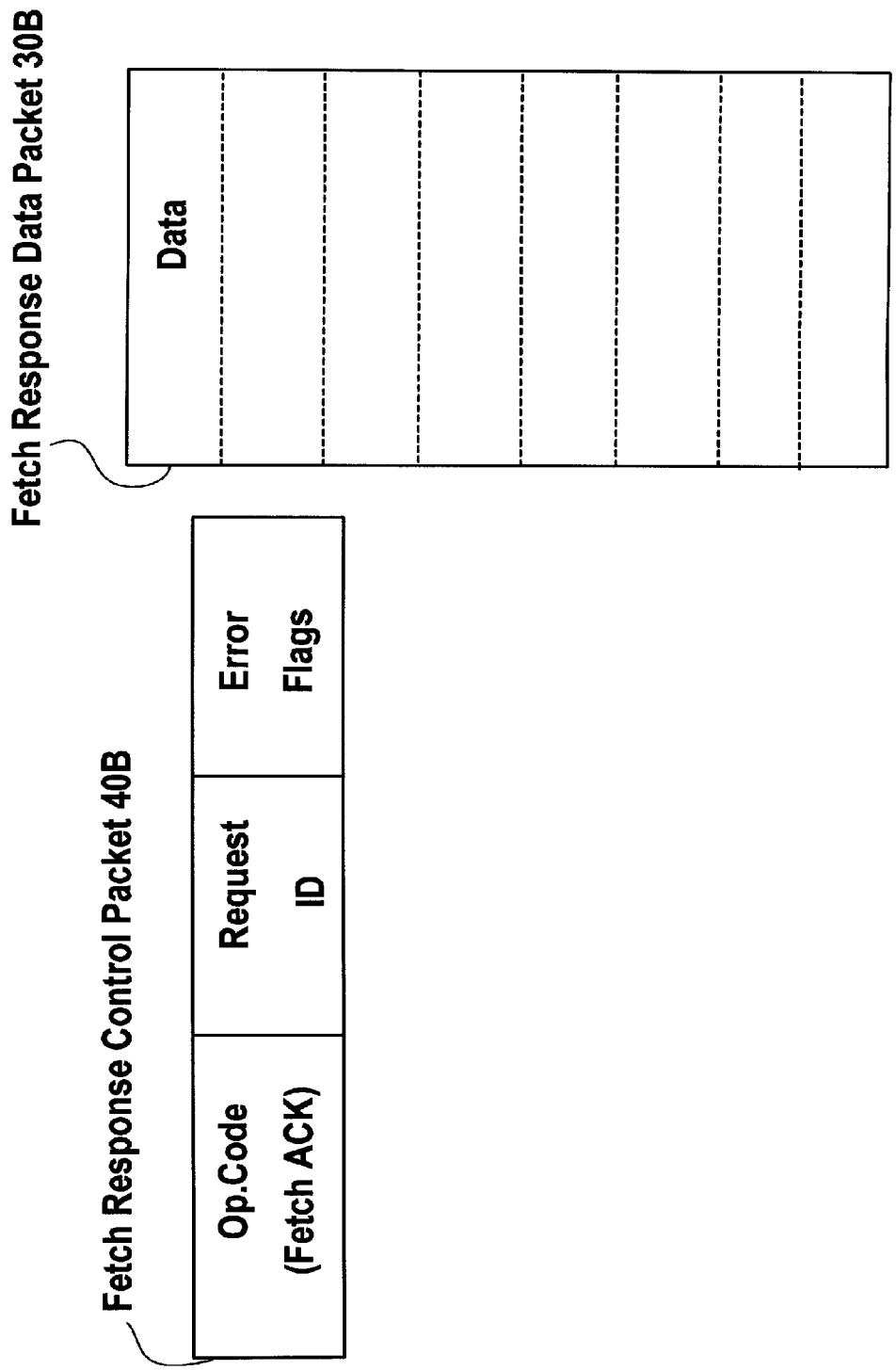
FIG. 4 is an explanatory diagram of reception response packet in the embodiment of the present invention.

On the other hand, the fetch response and data, as illustrated in FIG. 4, include the fetch response control packet 40 and the fetch response data packet 30B. The fetch response control packet 40B has the operation code (Op code)=Fetch ACK, Request ID (Identifier), and the error flag. The fetch response data packet 30B has the data specified by the DMA target address in the fetch request control packet 40A.

Figure 5:
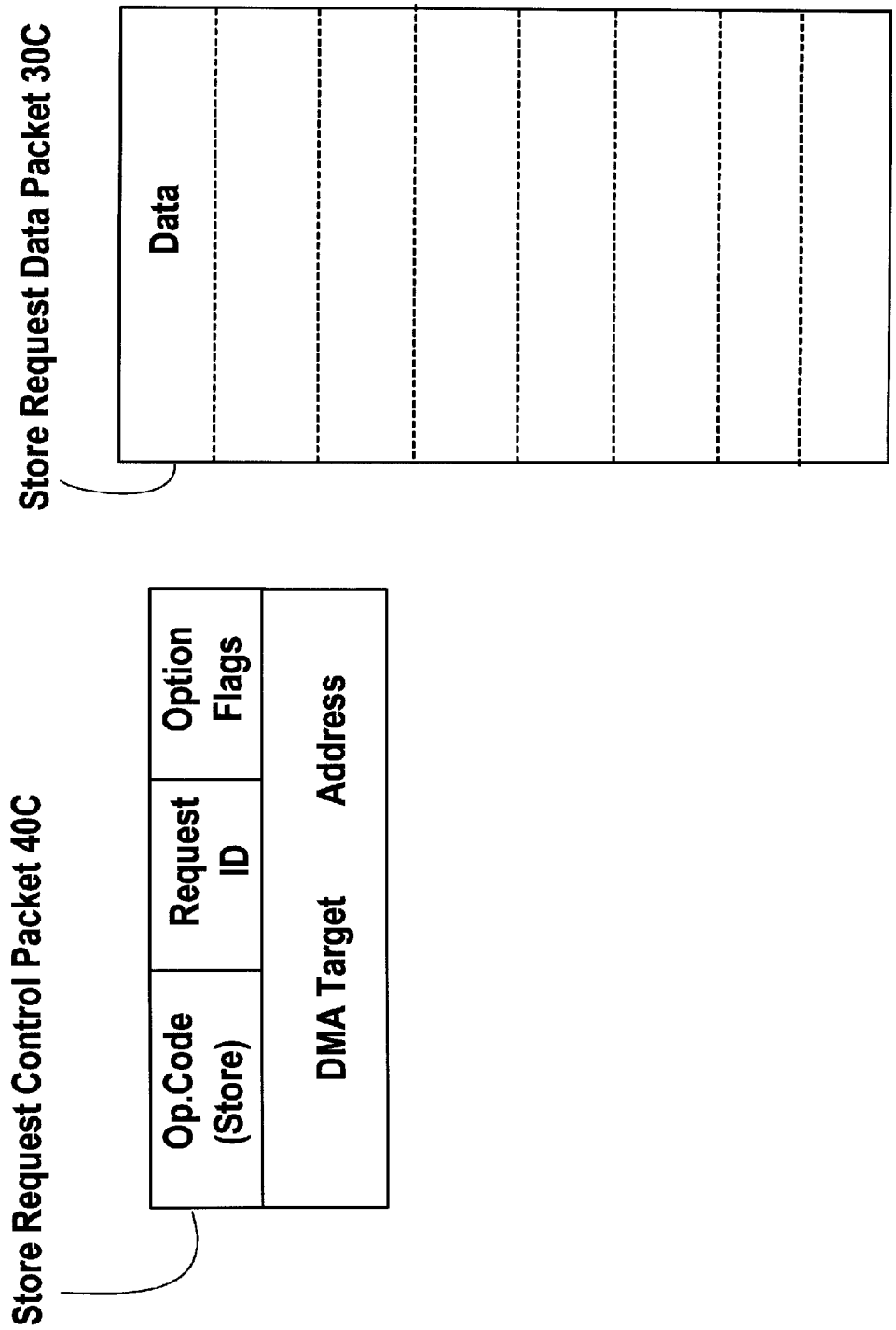
FIG. 5 is an explanatory diagram of transmission request packet in the embodiment of the present invention.

Next, the storing operation sends the store request and data to the DMAC 12 and obtains store response from the DMAC 12. As illustrated in FIG. 5, the store request includes the store request control packet 40C and the store request data packet 30C. The store request control packet 40C has the Operation Code (Op Code)=Store, Request ID (Identifier), the option flag, and the DMA target address. The store request data packet 30C has the data to be stored at the location specified by the DMA target address.

Figure 6:
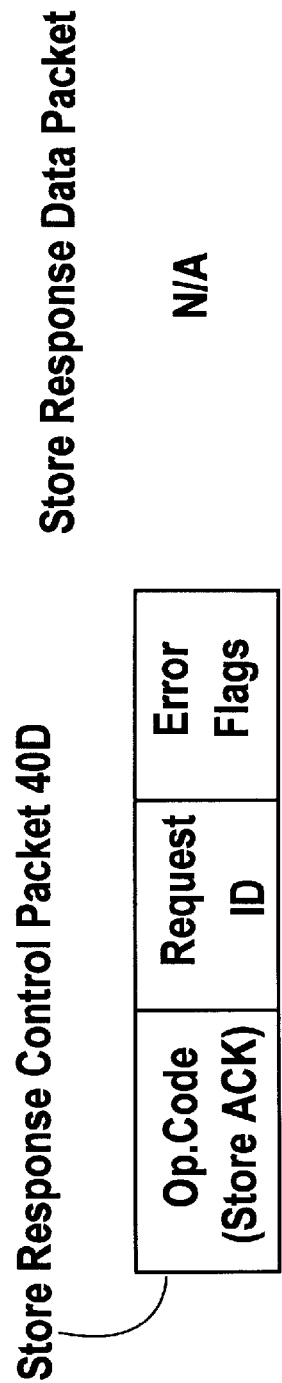
FIG. 6 is an explanatory diagram of transmission response packet in the embodiment of the present invention.

The store response, as illustrated in FIG. 6, includes the store response control packet 40D. Further, the store response control packet 40D has the operation code (Op Code)=Store ACK (Acknowledge), the request ID (Identifier), and the error flag. The store response does not have data packet.

Explained next with FIG. 2 is the memory access execution circuits 4-1 to 4-N. The data transfer control circuit 7 has the command Queue (Cmd Queue) 73, the notify Queue 72, the transmission controller (TX controller) 71, the payload fetch unit 74, the payload store unit 76, the reception controller (RX controller) 77, the notify queue 78, and the interrupt controller (Int Cont) 79.

In FIG. 2, the command queue 73, the notify queue 72, the payload fetch unit 74, the payload store unit 76, the notify queue 78, and the interrupt controller 79 are the demand sources of memory access according to the command from the command queue 73.

The command queue (buffer) 73 stores the copy of the commands memorized by the CPU block 10 in the main memory 2, executes commands in sequence, generates the fetch request control packet when the number of command in the command sequence is lower than predetermined value, and fetches the command sequence of the main memory 2 through the packet transmission circuit 5.

The payload store unit 76 receives the store data (payload) form the communication port through the cross bar switch 82, then generates the store request control packet 40C and the store request data packet 30C, as illustrated in FIG. 5. The reception controller 77 sends the store request control packet 40C and the store request data packet 30C of the payload store unit 76 through the bus 70, according to the store command from the command queue 73.

The notify queue 78 receives and queues the store response control packet 40D of the packet reception circuit 6 (refer to FIG. 6). The reception controller 77 reads the store response control packet 40D from the payload store unit 76 (refer to FIG. 6), then writes the ending status in the main memory 2 through the notify queue 78, or notify the ending status to the software using the method such as generation of the CPU interruption through the interrupt controller 79.

The transmission controller 71, corresponding to the fetch command from the command queue 73, makes the payload fetch unit 74 to generate the fetch request control packet 40A as illustrated in FIG. 3. Further, the transmission controller 71 sends the fetch request control packet 40A of the payload fetch unit 74 to the packet transmission circuit 5 through the bus 70.

The payload fetch unit 74 receives and queues the fetch response control packet 40B (refer to FIG. 4). The reception controller 77 reads the fetch response control packet 40B from the notify queue 72, confirms whether there is an error in the operation of the fetch request control packet 40A, writes the ending status to the main memory 2 through the notify queue 78, or notifies the ending status to the software using the method such as generation of the CPU interruption through the interrupting controller 79. The payload fetch unit 74 reads the fetch response data packet 30B (refer to FIG. 4) from the packet reception circuit 6 through the bus 70, assembles to the packet for the network, then outputs the packet to the cross bar switch 82.

The interruption control unit 79 executes the interruption process (retransmission interruption process etc.) according to the request from the transmission controller 71 and the reception controller 77, and then sends the interruption packet to the packet transmission circuit 5.

Next, the packet transmission circuit 5 has a plurality of transmission FIFO (First In First Out) units 50-1 to 50-N, an arbitration controller 54, a first arbitration circuit 56, and a second arbitration circuit 58. The plurality of FIFO units 50-1 to 50-N which are parallel connected to the bus 70, receive the control packet and the data packet, and stores the received packet to the each embedded-FIFO memory. The first arbitration circuit 56 arbitrates the control packets which do not have the data packets in each of FIFO units 50-1 to 50-N. The second arbitration circuit 58 arbitrates the control packets which do have the data packet within each of FIFO units 50-1 to 50-N.

The arbitration controller 54 selects (gives a grant to) the FIFO unit ought to be outputted based on the arbitration result of the first arbitration circuit 56 and the second arbitration circuit 58. The selected FIFO unit outputs the control packet and the data packet to the different lines (communication pathways). The control packet will be outputted by the narrow line illustrated in the diagram, and the data packet will be outputted by the thick line illustrated in the diagram when the data packet exists.

The multiplexer 52 outputs the control packet from the selected FIFO unit with the narrow line L1 in the FIG. 2, and outputs the data packet by the thick line L2 of the FIG. 2 when the data packet exists, to the bus controller 4. As mentioned later, in this embodiment, the control packet and the data packet are separated and outputted by the different paths (lines). Also, the control packet and the data packet in the FIFO units 50-1 to 50-N, which are a plurality of transmission sources, are separately arbitrated and the multiplexing of control packets is executed. Therefore, it can minimize the average time of delay in every communication.

Here, the transmission FIFO units 50-1 to 50-N correspond to the transmission unit, and the arbitration circuit 56 and 58, the arbitration controller 54, and the multiplexer 52 correspond to the de-multiplex/multiplex control circuit.

Next, the packet reception circuit 6 has a separator 60 which receives the control packet by the first line (narrow line) L3 and the data packet by the second line L4, and separates the control packet without the data packet, the control packet accompanied by the data packet, and the data packet. Thereafter, the control packet without data packet, the control packet accompanied by data packet, and the data packet are timing-controlled separately.

That is, the first error check circuit 61 error checks the control packet without data packet, and the delay circuit 62 delays the control packet which has been error checked (i.e., by one cycle). The first multiplexer 63 selects either the control packet from the first error check circuit 61 or the delayed control packet from the delay circuit 62.

On the other hand, the second error check circuit 64 error checks the control packet accompanied with the data packet, then outputs it to the second multiplexer 65. The second multiplexer 65 selects either the control packet from the first multiplexer 63 or the data packet and the control packet from the second error check circuit 64, then outputs that to the request decoder 66.

The request decoder 66 decodes and identifies the operation code and ID of the control packet and outputs it to the reception FIFO units 68-1 to 68-N, which correspond to the operation code and ID, through the separator 67. Since these reception FIFO units 68-1-68-N are provided with correspondence to the operation code and ID, the command (Cmd) queue 73, the notify queue 72, the payload fetch unit 74, the payload store unit 76, the notify queue 78, and the interruption control unit 79, which are the requestor, can take out the corresponding control packet and data packet through the bus 70.

As the transmission FIFO units 50-1 to 50-N also are corresponding to the operation code and ID, the command queue 73, the notify queue 72, the payload fetch unit 74, the payload store unit 76, the notify queue 78, and the interruption control unit 79, which are the requestor, can set the control packet and the data packet to the corresponding transmission FIFO units 50-1 to 50-N through the bus 70.

(Packet Transmission Circuit)

Figure 7:
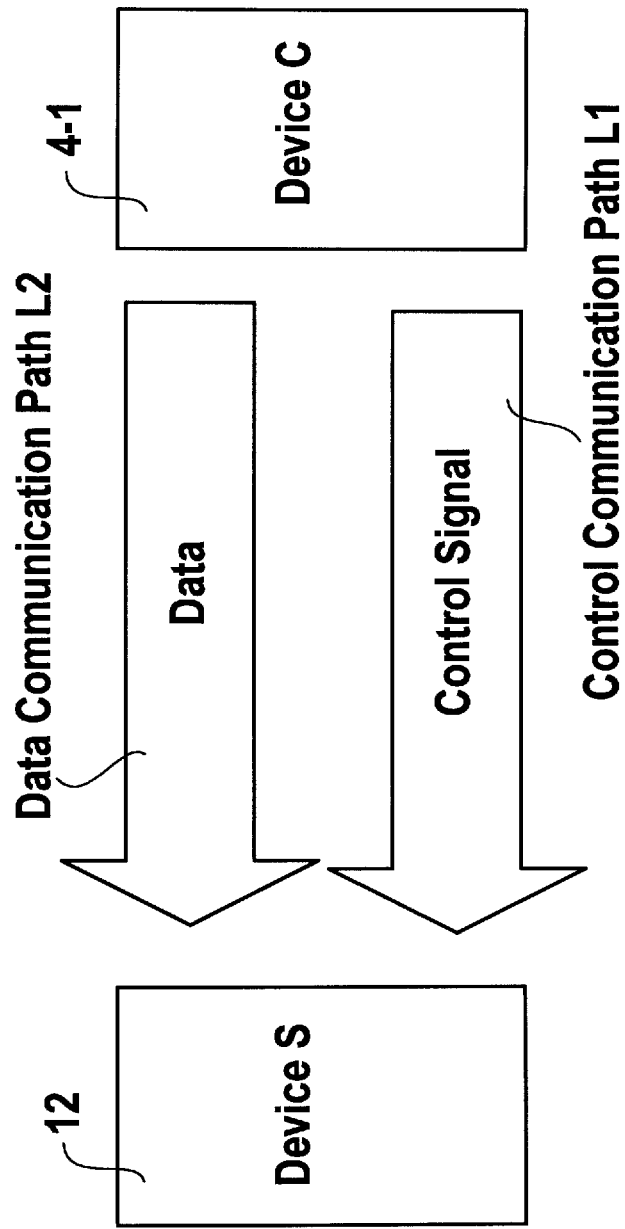
FIG. 7 is an explanatory diagram of the separated channels of the packet transmission circuit in FIG. 2.
Figure 8:
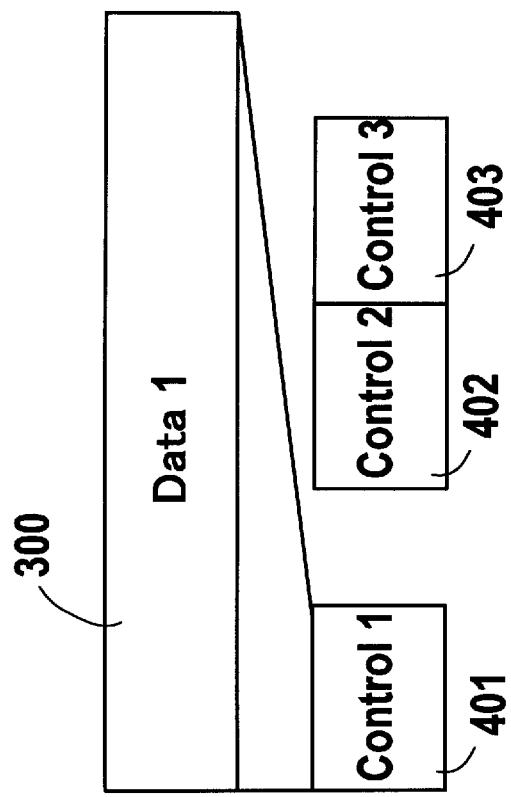
FIG. 8 is an explanatory diagram of the multiplexing structure of the control packet in FIG. 7.
Figure 9:
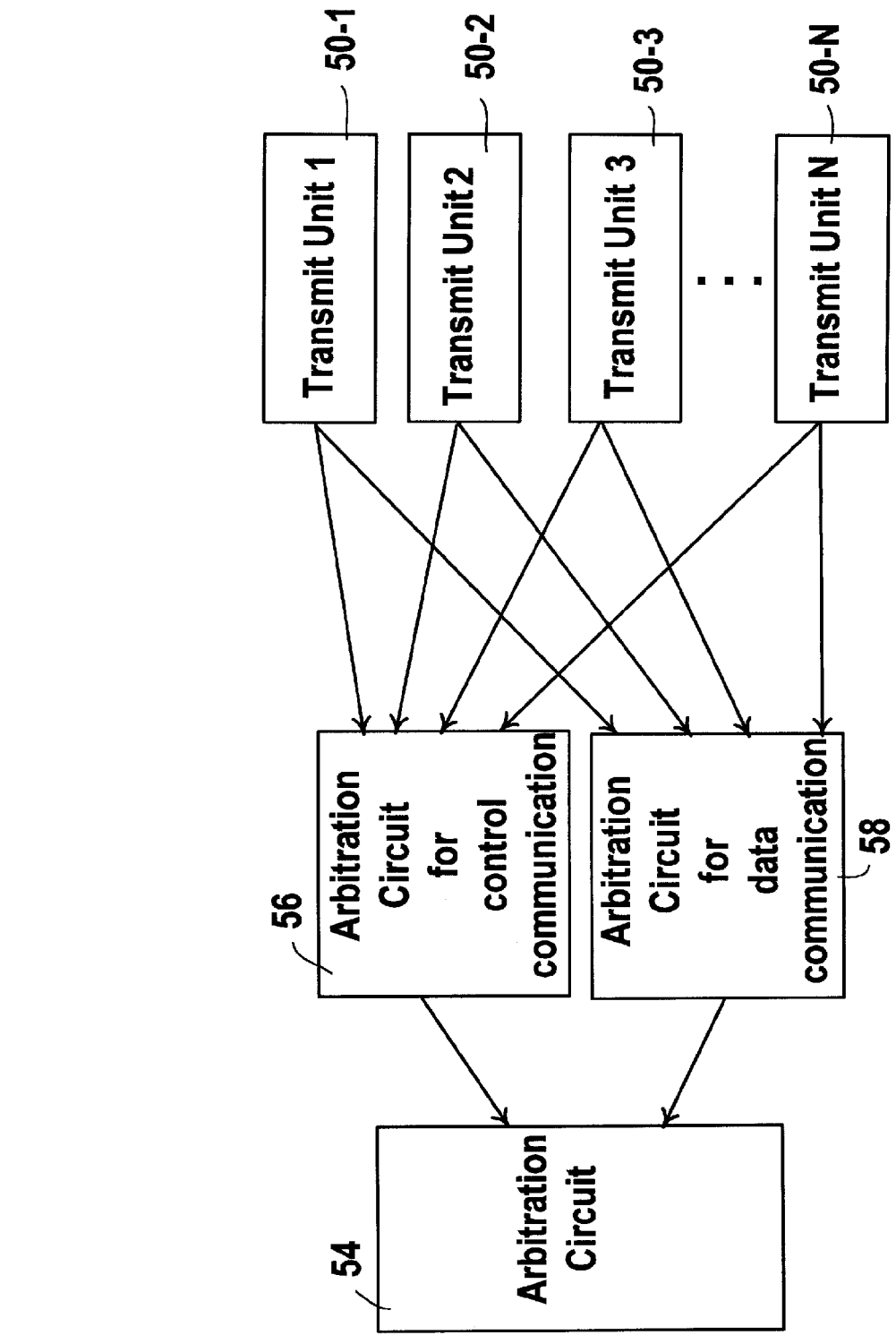
FIG. 9 is an explanatory diagram of the arbitration operation of the packet transmission circuit in FIG. 2.

FIG. 7 illustrates the packet transmission method of the embodiment. FIG. 8 illustrates the control packet multiplex communication in FIG. 7. And FIG. 9 illustrates the arbitration method. As explained in FIG. 2, the separating and the multiplexing of communication pathway of the control packet and the data packet are executed. Here, control communication pathway and data communication pathway include the pathway which is logically separated, as well as one physically separated.

For example, the embodiment can be applied for separating virtual channel into control pathway and data communication pathway using the serial bus such as the PCI (Peripheral Component Interface)-Express bus (physical bus). Hereafter, the control communication pathway and the data communication pathway will be explained in physically-separated form in the figures, but the pathway includes the bus form which is not physically-separated.

As illustrated in FIG. 7, the communication pathways between the devices 4-1 and 12 are separated into the pathway for the control packets and the pathway for the data packets. That is, the reception request without data (the fetch request control packet in FIG. 3) and the reception response (the store response control packet in FIG. 6) are communicated only via the control communication pathway L1. Also, the data transmission request with data (the store request control packet and the data packet in FIG. 5) and the data reception response with data (the fetch response control packet and the data packet in FIG. 4) are communicated via both of the control communication pathway L1 and the data communication pathway L2. FIG. 7 illustrates one-way communication pathway as an example, and the same communication pathway is applied to the return pathway.

Also, as illustrated in FIG. 8, it is conditioned that the control information (control packet) 401 of the communication with the data 300 is synchronously transmitted and received between both communication pathways L1 and L2. On the other hand, regarding the communication only with the control information (control packets) 402 and 403, as illustrated in FIG. 8, the control information is transmitted being convoluted into the transmission period of another communication, Hence, small control packets can be issued without waiting for long data communication, and the Shortest Job First can be executed effectively.

Also, the transmission side introduces the class hierarchy arbitration to avoid the starvation of communication. Each of the transmission units (FIFO units) 50-1 to 50-N in the packet transmission device 5 in FIG. 2 executes the control communication with or without data arbitrarily.

On this occasion, the units which execute control communication without data are considered as the first group, the units which execute control communication with data are considered as the second group, and each group is arbitrated individually. In FIG. 9, the arbitration circuit for control communication 56 and the arbitration circuit for data communication 58 arbitrate the control packet with and without data individually. Here, a fair arbitration circuit indicates general arbitration circuit, and the arbitration methods such as the round-robin method and the LRU (Last Recent Used) method may be used complying with the request of fairness. That is, the point of the idea is that the packets are grouped according to the packet without data and with data, the arbitrations are executed for each group.

Moreover, the arbitration controller 54 arbitrates between these two winners of the above arbitration processes and decides the final transmission unit. The arbitration here is the best arbitration and does not necessarily have to be fair. Because the transmission unit which is arbitrated at the arbitration circuit 58 for data communication cannot execute next transmission until the pathway for data communication L2. So this time period which cannot execute next transmission does not block the next data communication even if the winner of the arbitration circuit for control communication 56 wins.

On the contrary, while the data communication pathway L2 is empty, the winner of the arbitration by the arbitration circuit 58 for data communication may win preferentially. This is only for while the data communication pathway L2 is empty. Because the empty slot, which surely executes the control communication, can be secured in data communication cycle.

Or, the arbitration controller 54 may apply the LRU method with BUSY control. The above control can be actualized with controlling of LRU if only the period where each of communication pathways L1 and L2 can be used is targeted for the arbitration. Also, when the data communication with short packets, which do not narrow the other control communications during data communication, is allowed, a control by using LRU method can avoid starved situation safely.

Figure 10:
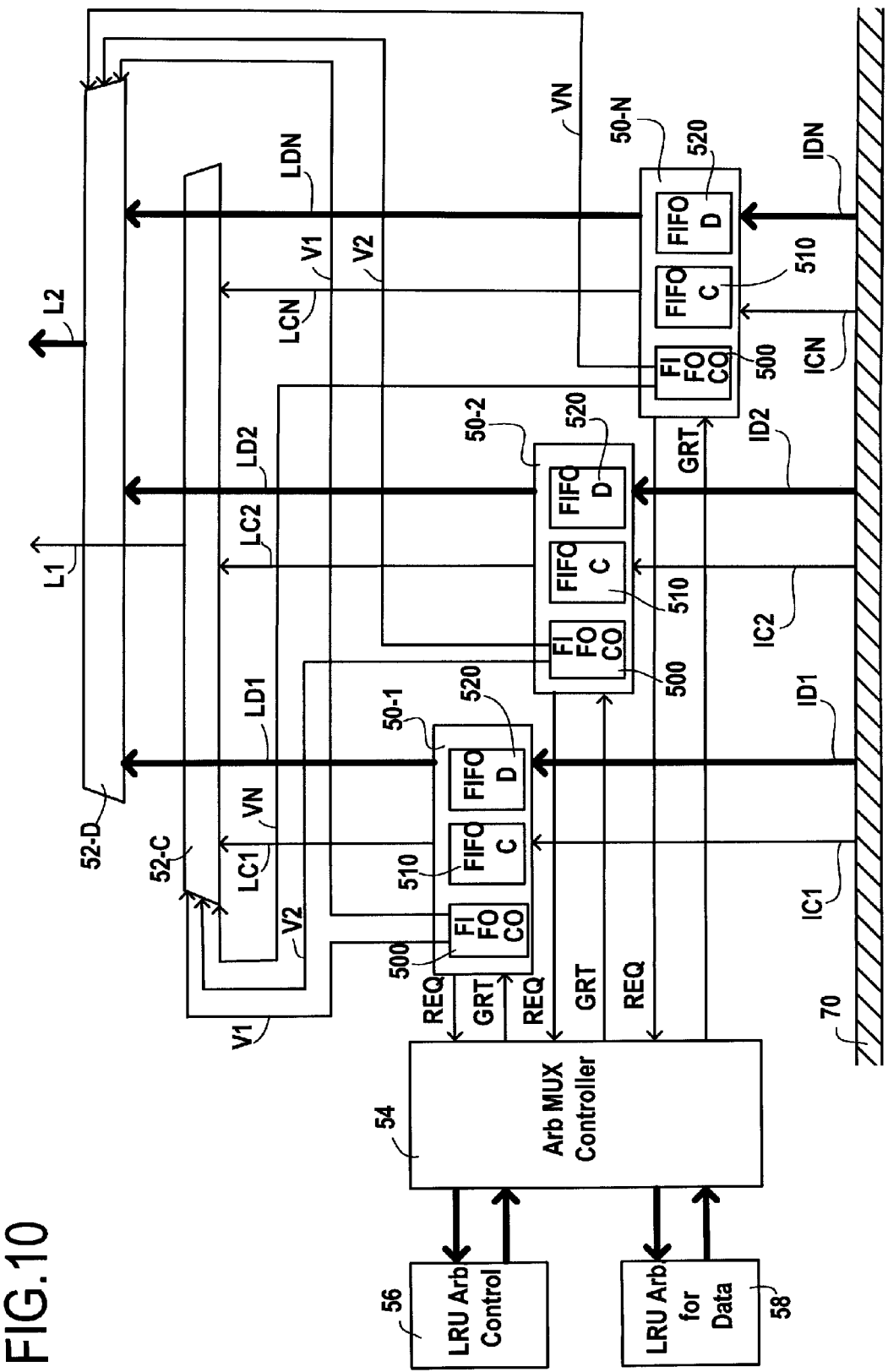
FIG. 10 is a block diagram of the packet transmission circuit in FIG. 2.
Figure 11:
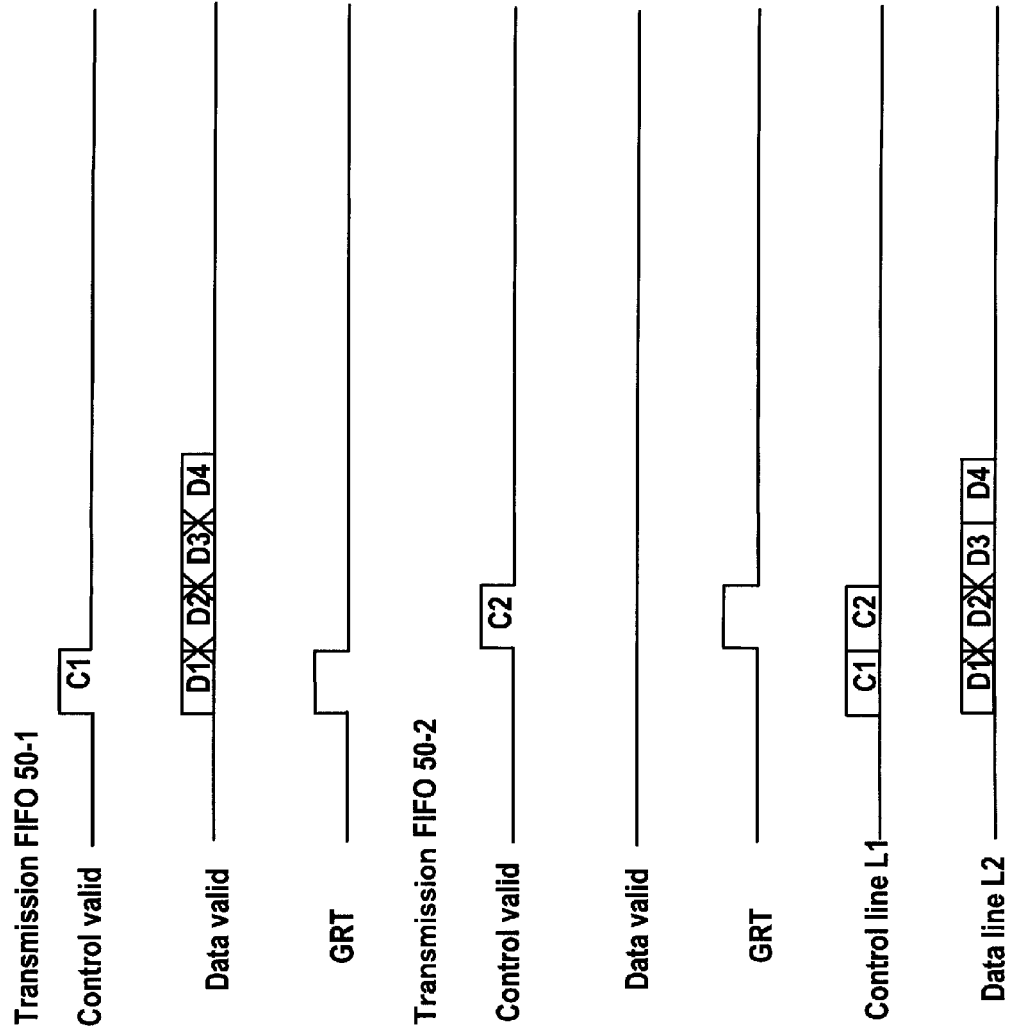
FIG. 11 is a time chart diagram of the packet transmission circuit in FIG. 10.

Explained next with FIG. 10 and FIG. 11 is the packet transmission circuit. FIG. 10 illustrates the block diagram of packet transmission circuit in FIG. 2, and FIG. 11 illustrates the time chart diagram of packet transmission circuit in FIG. 10.

In FIG. 10, the elements explained in FIG. 2, and FIG. 7 to 9 are illustrated in the same symbols. As illustrated in FIG. 10, a plurality of FIFO units 50-1 to 50-N, which are connected parallel to the bus 70, have the FIFO memory 510 for control packet, the FIFO memory 520 for data packet, and the FIFO controller 500.

The FIFO memory 510 for control packet receives and stores the control packet through signal line IC1 (IC2 to ICN) from the bus 70. The FIFO memory 520 for data packet receives and stores the data packet through the signal line ID1 (ID2~IDN) from the bus 70. The FIFO controller 500 controls the FIFO memories 510 and 520, and multiplexers 52-C and 52-D.

The FIFO controller 500 notifies the operation code of the leading control packet in the FIFO memory 510 for control packet as request to the arbitration controller 54. The arbitration controller 54 identifies whether the packet is the control packet with data explained in FIG. 9, or the control packet without data, based on the operation code of the control packet from each FIFO unit 50-1 to 50-N.

The arbitration controller 54 sends (the FIFO unit number of) the control packet with data to the second arbitration circuit 58. The second arbitration circuit 58 arbitrates the FIFO unit of the control packet with data and decides the winner. Also, the arbitration controller 54 sends (the FIFO unit number of) the control packet without data to the first arbitration circuit 56. The first arbitration circuit 56 arbitrates the FIFO unit of the control packet without data and decides the winner.

Then, the arbitration controller 54, as explained in FIG. 9, gives the win to the winner of the first arbitration circuit 56 when the data communication pathway L2 is occupied, and gives the win to the winner of the second arbitration circuit 58 preferentially when the data communication pathway L2 is empty. And then the arbitration controller 54 gives a grant (GRT) to one of FIFO units 50-1 to 50-N which is the winner.

At the granted FIFO unit (i.e. 50-1), the FIFO controller 500 generates the valid signal V1 and outputs the leading control packet of the FIFO memory 510 to the signal line (control communication pathway) LC1. Also, the FIFO controller 500, when judging that the control packet has the corresponding data packet in the FIFO memory 520 based on the operation code of the control packet, outputs the data packet in the FIFO memory 520 to the signal line (data communication pathway) LD1. The same operation is executed when the grant is given to the other FIFO units 50-2 to 50-N.

On the other hand, the multiplexer 52 has the first multiplexer 52-C, which is connected to the signal lines (the control communication pathways) LC1 to LCN of each FIFO units 50-1 to 50-N, and the second multiplexer 52-D, which is connected to the signal lines (the data communication pathways) LD1 to LDN of each FIFO units 50-1 to 50-N.

The first multiplexer 52-C selects one of the signal lines (control communication pathways) LC1 to LCN by the valid signals V1 to VN, then connects the selected signal line to the control communication pathway (bus) L1. Accordingly, the leading control packet of the FIFO memory 510 for the control packet of the selected FIFO unit is outputted from the first multiplexer 52-C to the control communication pathway L1.

Likewise, the second multiplexer 52-D selects one of the signal lines (data communication pathways) LD1 to LDN by the valid signals V1 to VN, then connects the selected signal line to the data communication pathway (bus) L2. Accordingly, the leading data packet of the FIFO memory 520 for the data packet in the selected FIFO unit is outputted.

The arbitration controller 54, in every cycle, repeats this arbitration and selection operation. Hence, as explained in FIGS. 8 and 9, when the data communication pathway L2 is occupied, the winner of the control packet of the first arbitration circuit 58 is given the win, or when the data communication pathway L2 is empty, the winner of the second arbitration circuit 58 is given the win preferentially. Therefore, small control packets can be issued without waiting for the long data communication and execute the shortest job preferment effectively. Also, it may avoid the starvation of the communication by the class hierarchy arbitration.

FIG. 11 illustrates the sequence of communication control with which the control packet C1 with data D1 to D4 is stored at the forefront in the FIFO unit 50-1, and the control packet C2 without data is stored at the forefront in the FIFO unit 50-2.

In this example, the transmission FIFO unit 50-1 is selected by the arbitration at the leading cycle, then the leading control packet C1 of the FIFO memory 510 in the FIFO unit 50-1 is outputted to the control communication pathway L1, and the leading data packets D1 to D4 of the FIFO memory 520 in the FIFO unit 50-1 are outputted to the data communication pathway L2 as the data communication pathway L2 is empty.

In the next cycle, the transmission FIFO unit 50-2 is selected, and the leading control packet C2 of FIFO memory 510 in the FIFO unit 50-2 is outputted to the control communication pathway L1. In this way, as short control packet can be transmitted without waiting for long data communication, the Shortest Job First control can be executed and the starvation of communication can be prevented.

Here, as for the Round Trip communication, it is desired to use up the communication band as much as possible for streamlining the communication. To do that, the following relational expression is needed to be satisfied regarding the average response time and the number of simultaneous communications.

Communication pathway occupied time per single communication (S)×the Number of Simultaneous Communications (N)≧Average Round Trip communication time (T).

To increase the number of simultaneous communications, it is necessary to have the control tables, which holds the communication information, of the number of communications, and also the buffer which holds the data in communication for resending is needed. These components are the dominating hardware cost in the communication control circuit and increase in proportion to the number of simultaneous communications. Therefore, it is important to minimize the number of simultaneous communications (N) as much as possible.

Also, the communication pathway occupied time (S) corresponds to the packet size in the packet communication. To satisfy the above relational expression, upon minimizing N, the way of maximizing S can also be considered. According to the Shortest-Job-First method, to prevent average communication delay, the small packet needs to be controlled preferentially and the way of maximizing the size of the packet goes against the policy. That is, it will become difficult to control to keep that the average Round Trip communication time (T) is small. Also, the size of buffer needs to be maximized so in terms of suppressing the hardware cost, it is preposterous.

Hence, if the same configuration is to be undertaken, it is desired to actualize the control to minimize the average round trip communication time (T) in the ways of using up the communication band and the hardware cost. In this embodiment, As the Shortest-Job-First control is executed by separating the data communication pathway and the control communication pathway and multiplexing the control packet into the control communication pathway, the average Round-Trip communication time can be shortened and the hardware cost can be reduced.

(The Packet Reception Circuit)

Figure 12:
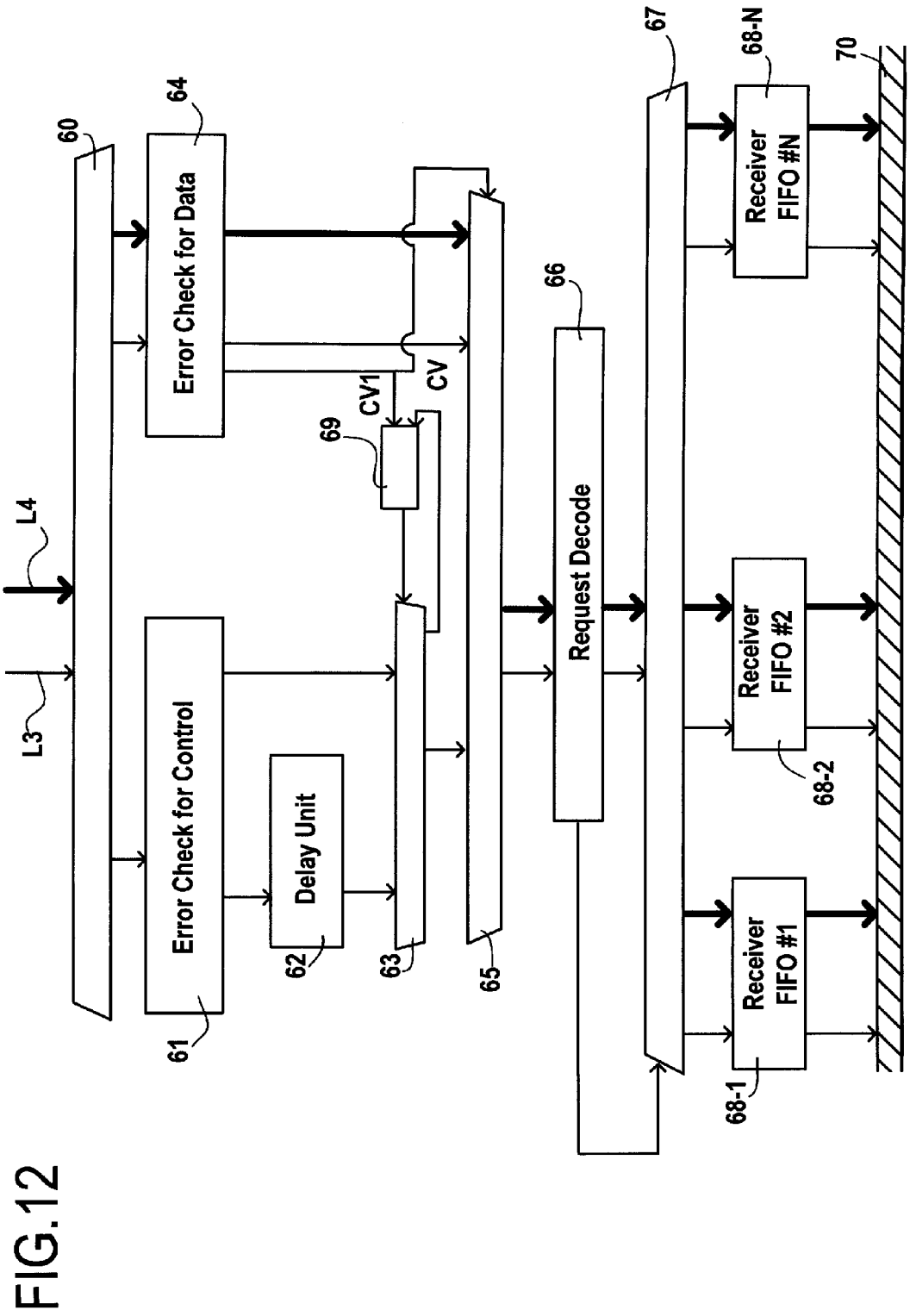
FIG. 12 is a block diagram of the packet reception circuit in FIG. 2.
Figure 13:
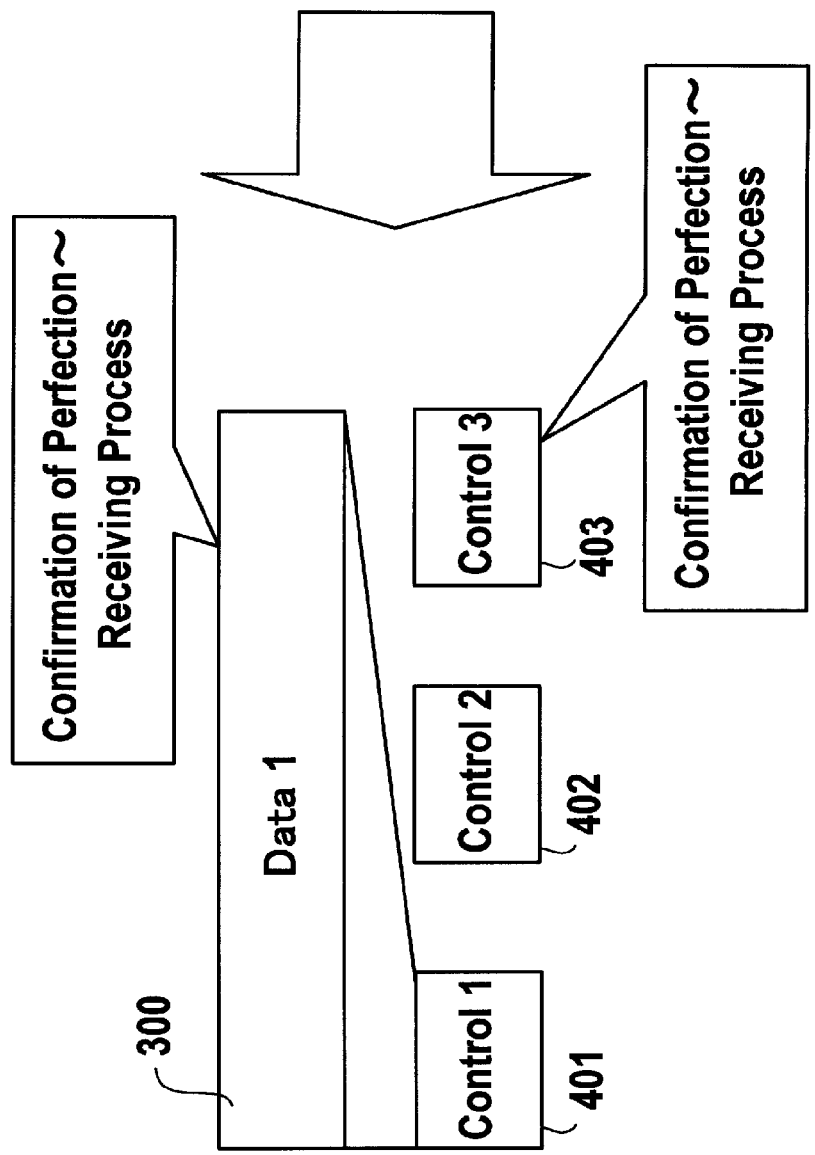
FIG. 13 is an explanatory diagram of the packet collision of the packet reception circuit in FIG. 12.
Figure 14:
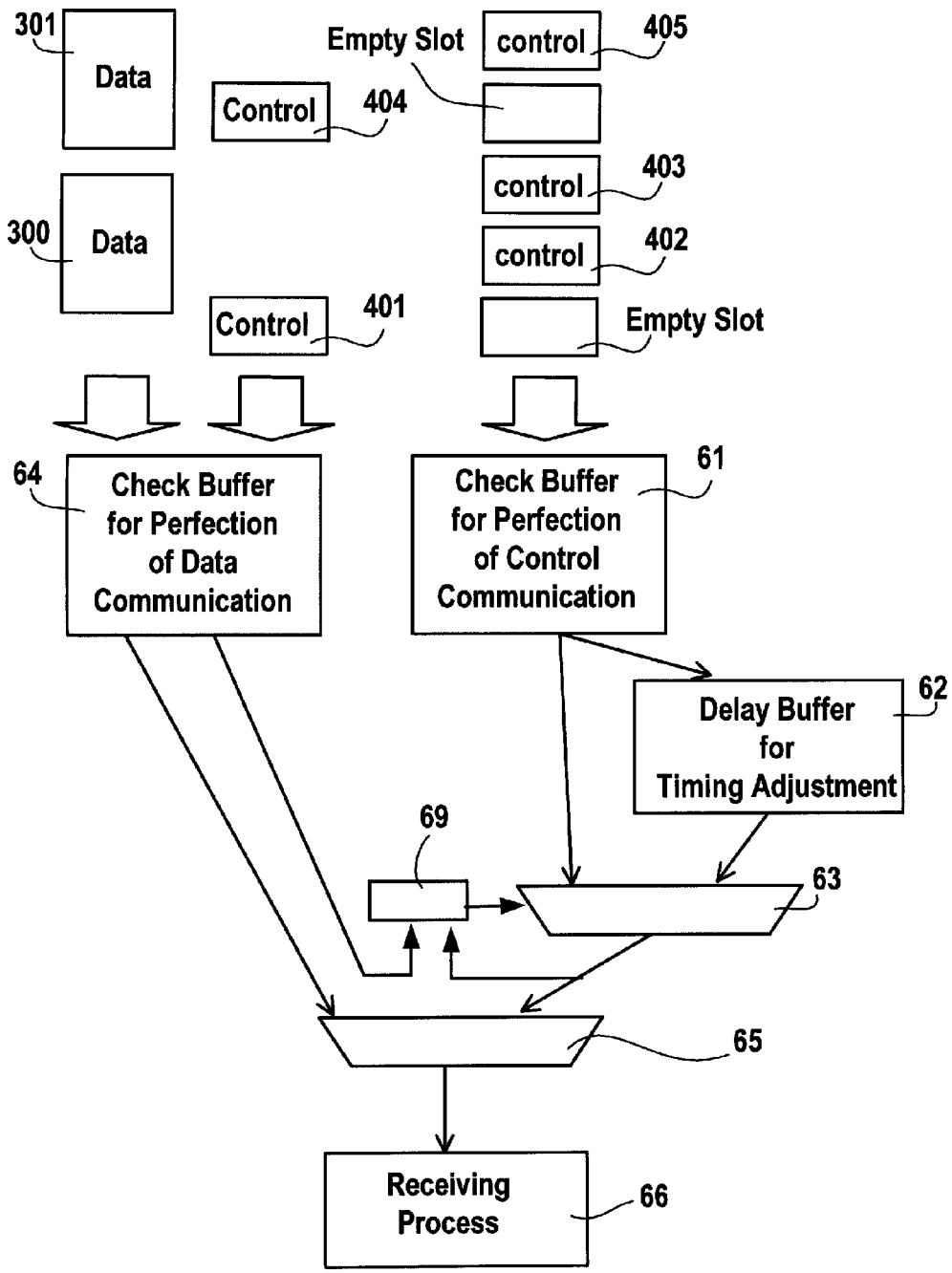
FIG. 14 is an explanatory diagram of the collision avoidance behavior of the packet reception circuit in FIG. 12.
Figure 15:
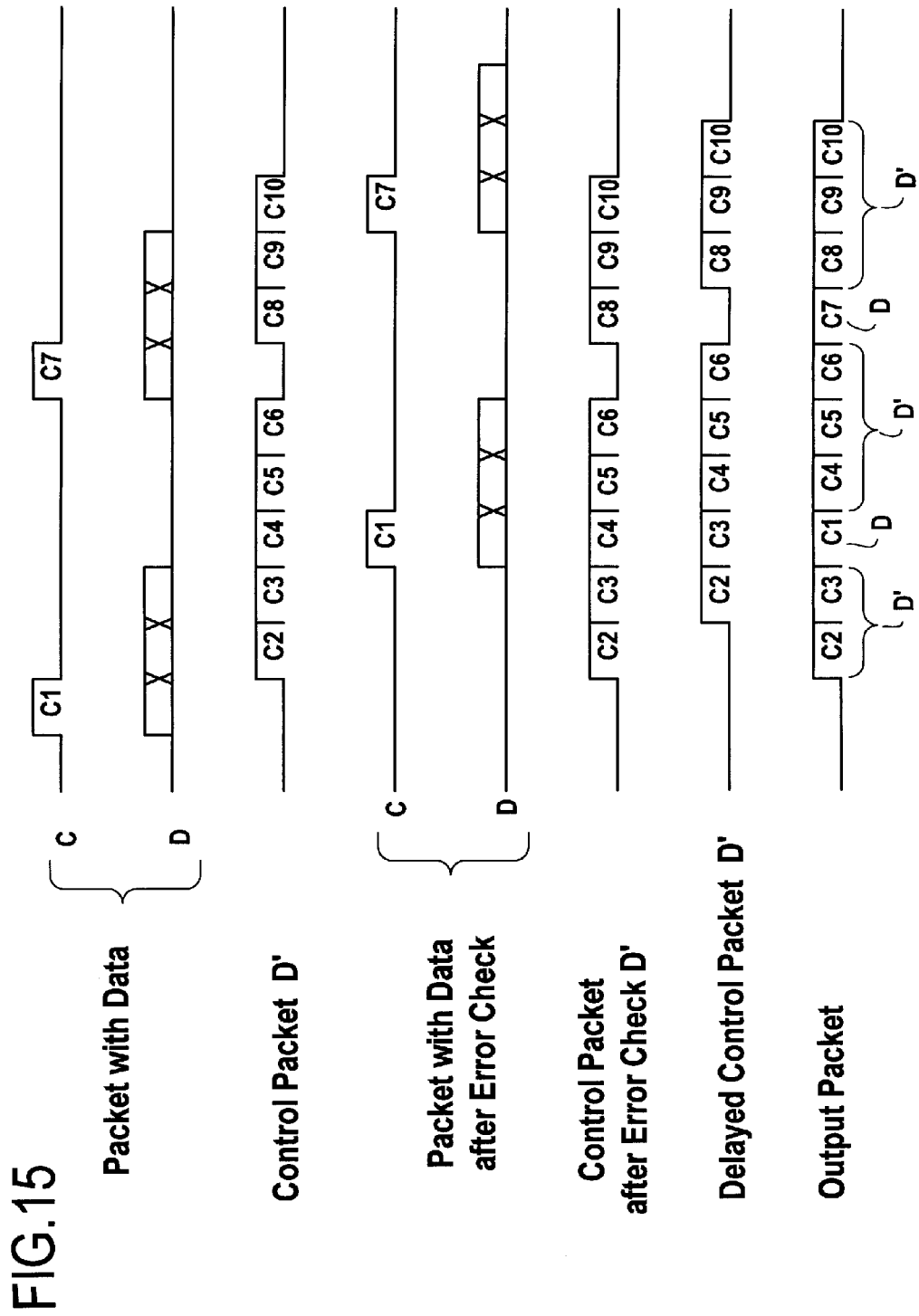
FIG. 15 is a time chart diagram of the packet reception circuit in FIG. 12.
Figure 16:
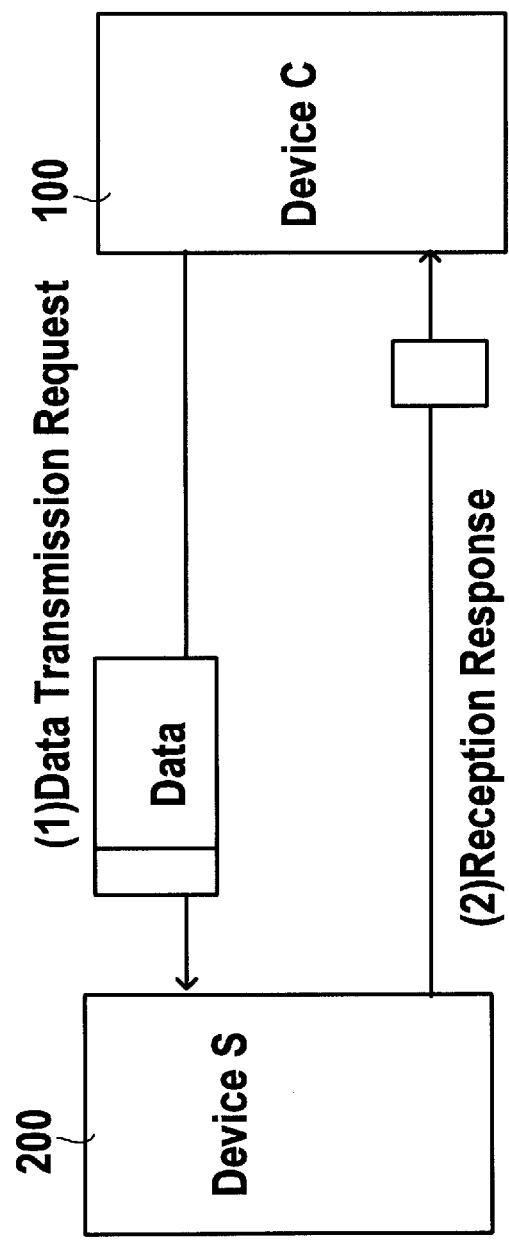
FIG. 16 is an explanatory diagram of data transmission request and reception response of related art.
Figure 17:
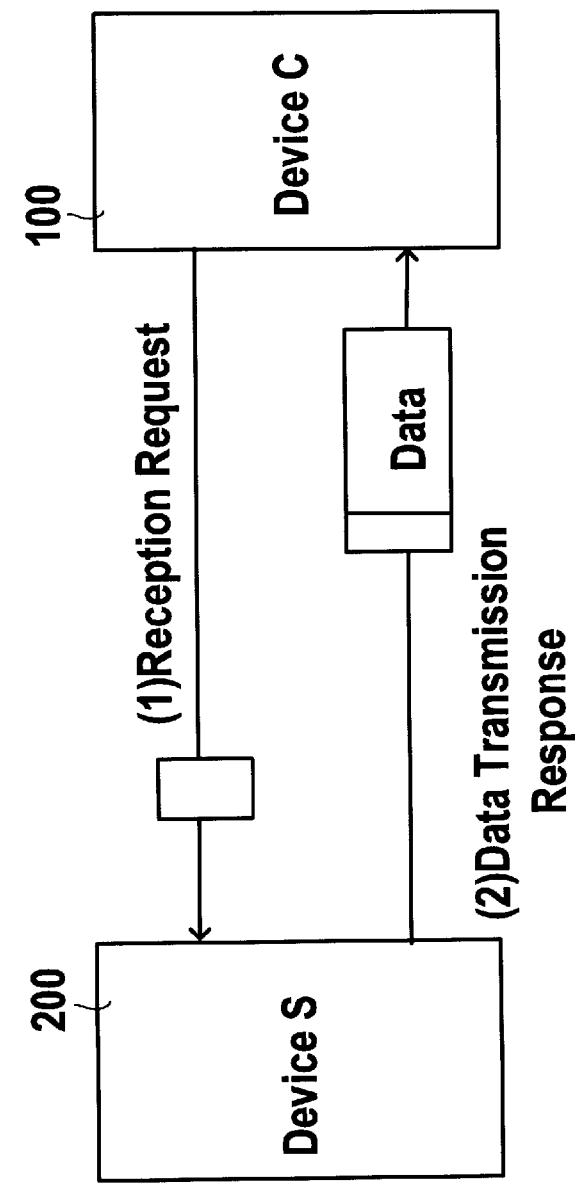
FIG. 17 is an explanatory diagram of data reception request and transmission response of related art.

FIG. 12 illustrates the block diagram of the packet reception circuit in FIG. 2. FIG. 13 illustrates the explanatory diagram of the necessity of timing correction at receiving side in FIG. 12. FIG. 14 illustrates the explanatory diagram of the receiving timing correction. FIG. 15 illustrates the time chart diagram of receiving operation in FIG. 12.

The case where the timing correction is needed is explained with FIG. 13. It is desirable that the circuit of receiving side executes the receiving process in single reception circuit on the communication pathways L1 and L2 divided into control and data. The control information (packet), as it is sent serialized on control communication pathway L1, does not need to process two packets at a time. However, considering the actual communication, when the communication data is destroyed in the pathway, it is desired to discard the communication data and then re-send the data from transmitting.

In this case, the perfection of the data including control information cannot be confirmed until all of the communications on the data communication pathways are finished. That is, it is desirable that the reception process of the packets with data is to be executed at the end timing of data reception. As illustrated in FIG. 13, when the control packet 403 reaches to the final timing of the communication of the data packet 300, which is attached to the control packet 401, the reception processes of the control packet 401, the data packet 300, and the control packet 403 will be coincided.

In order to avoid the situation of coinciding of the reception process of the above data packet 300 and the control packet 403, the circuit, which separates the communication with data from the communication without data, and then re-multiplexes, is provided. The details are explained by using FIG. 12 to FIG. 14. In FIG. 12, the elements explained in FIG. 2 are illustrated in the same symbols. In FIG. 12, the bold line indicates the data communication pathway (bus) and the narrow line indicates the control communication pathway.

The separator 60 receives the control packets 401 to 405 from the first line (narrow line) L3 and data packets 300 and 301 from the second line L4, then separates the packets into the control packet 402, 403 and 405 without data packet, the control packets 401 and 404 which are with the data packets 300 and 301, and the data packet 300 and 301 by decoding and identifying the operation code of the control packet. Thereafter, the control packet 402, 403 and 405 without data packet, the control packets 401 and 404 which are with the data packets and the data packet 300 and 301 are timing-controlled individually.

The control packets 402, 403 and 405 without data packet are error checked at the first error check circuit (the buffer for checking perfection) 61. For example, the CRC (Cyclic Redundant Code) check is preferable. The delay circuit 62 delays the control packet which has been error checked (i.e., by one cycle). The control packet from the first error check circuit 61 and the delayed control packet from delay circuit 62 are imputed to the first multiplexer 63.

On the other hand, the control packets 401 and 404 with data packet and the data packet 300 and 301 are error-checked by the second error check circuit 64 at the ending of the data packet and then outputted to the second multiplexer 65. For example, the CRC (Cyclic Redundant Code) check is preferable. The second error check circuit 64, when it does not detect error, outputs the first valid signal CV1.

Also, the first multiplexer 63 outputs the second valid signal CV2 when the output signal is valid. The switch controller 69 receives both valid signals CV1 and CV2, makes the first multiplexer 63 to select the output of delay circuit 62 when the first valid signal CV1 is effective (ON), and keeps the first multiplexer 63 to select the output of the delay circuit 62 until the first valid signal is ineffective (OFF). When the first valid signal becomes not effective (OFF), the first multiplexer 63 selects the output of the first error check circuit 61.

The second multiplexer 65 selects the control packet from the first multiplexer 63 when the first valid signal CV1 is not effective (OFF), and selects the control packet and the data packet from the second error check circuit 64 when the first valid signal is effective (ON), then outputs it to the request decoder 66.

In other words, at the input stage of the first multiplexer 63, the one-stage buffer (delay circuit 62) is provided for avoiding the collision at the second multiplexer 65. The received packets are divided into a group of the packet with data and a group of the packet without data, and each group are inputted to the buffer for checking perfection for data communication (the second error check circuit 64), or the buffer for checking perfection for control communication (the first error check circuit 61), assigned to each group.

Each perfection check is executed at the ending of the packet and the broken packets are discarded here. Only the correct packets go through the check buffer 61 and 64. As explained in FIG. 13, the control packet may come out from the buffer 61 for data communication and the buffer 64 for control communication both at the same time.

For this situation, the delay buffer 62 for adjusting the timing of control communication side is provided. When the competition with the data communication side occurs, the packet of the control communication is outputted in the timing of one packet delayed by the buffer 62 for the timing adjustment. By this operation, the collision timing is avoided and the packets of the data communication side are receiving processed.

In the data communication side, as the next perfection check ends at the completion of data communication, the data of the control communication side can be inputted to reception process steadily from the next timing of collision. Also, as the control packets for the control communication are not transmitted redundantly to the error check circuit 61 of the communication with data, there is always one-packet gap until the finish of the next perfection check of the data side (refer to FIG. 14). At the point of detecting the gap, as the switching from the data of the delay buffer 62 side to the data of the perfection check buffer 61 side is possible, the timing adjustment delay buffer 62 is prepared for only one slot.

An example is explained with the time chart in FIG. 15. FIG. 15 illustrates the example of the control packet C with data, the data packet D, and the control packet D' without data. FIG. 15 illustrates that the control packet are transferred in order of C1, C2, through C10 in series, and the three cycles of the data packets D are transferred synchronously with the control packet C1 and C7.

As the control packet C with data and the data packet D are error-checked after completing the reception of all of the data packets D, the control packets C and the data packet D, which are the packets with the error-checked data, are outputted after three cycles from the moment of reception. On the other hand, the control packet D' without data is error-checked at the time of reception.

The control packet D' without data is delayed by one cycle. When the above timing correction prioritizing the control packet with data is executed, the control packet outputted from the multiplexer 65 are lined up in series in order of the control packets C2 and C3 without data, the control packet C1 with data, the control packets C4, C5, and C6 without data, the control packet C7 with data, and the control packets C8, C9, and C10 without data. Therefore, the collision avoidance in the receiving side is made possible.

The request decoder 60 identifies (decodes) the operation code and ID of the control packet, then outputs it to the reception FIFO unit 68-1 to 68-N, which correspond to the operation code and ID, through the separator 67.

Other Embodiments

In the above embodiment, though the storing, the reception request, the transmission response and the fetch example is used to explain the transmission request and reception response of the Round-Trip transfer, it may also be applied to other transferring operations. Moreover, though the memory access execution circuit is used to explain the circuit which has the packet transmitting circuit and the packet receiving circuit, it may also be applied to transferring circuit for other purpose of use. The packet transferring system may also be applied to various sorts of IC (Integrated Circuit) and the LSI (Large Scale Integrated Circuit) which execute the transferring between buses.

The average Round Trip communication time can be shortened and the hardware cost can be reduced because the Shortest-Job-First control is implemented by separating data communication pathway from control communication pathway logistically or physically, and also multiplexing the control communication pathway with control packet. Furthermore, as the control packet with data are synchronously transferred with the data packet using different pathways, it is possible to avoid the complication of receiving process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A packet communication control device which transfers a first control packet having control information when transferring the control information and a second control packet having the control information and a data packet having data when the data is attached to the control information, comprises:
    a plurality of sending units;
    a multiplexer that selects an output of the sending units; and
    a multiplex control circuit that controls a transfer operation of said sending units, the multiplexer control circuit including:
        a first arbitration circuit that arbitrates a first control packet of said sending units;
        a second arbitration circuit that arbitrates a second control packet of said sending units; and
        an arbitration control circuit that selects one of said sending units to simultaneously transfer the second control packet to a control communication pathway and the data packet attached to the second control packet to a data communication pathway according to an arbitration result of said second arbitration circuit and selects one of said sending units to transfer the first control packet to the control communication pathway during transferring of the data packet to the data communication pathway according to another arbitration result of said first arbitration circuit.

2. The packet communication control device according to claim 1, further comprising a packet reception circuit that receives the first and second control packets from the control communication pathway and the data packet from the data communication pathway, said packet reception circuit including
    a first error check circuit that checks an error of the first control packet from the control communication pathway;
    a second error check circuit that checks an error of the second control packet and the data packet; and
    a timing adjustment circuit that adjusts a timing between the first control packet that the first error check circuit have not detected the error and the second control packet that the second error check circuit have not detected the error.

3. The packet communication control device according to claim 2, wherein said timing adjustment circuit comprises:
    a delay circuit that delays the first control packet that the first error check circuit have not detected the error; and
    a multiplexer that selects either one of delayed said first control packet and said first control packet that did not delayed by a timing of the second control packet that the second error check circuit have not detected the error.

4. The packet communication control device according to claim 2, wherein said packet reception circuit further comprises a separating circuit that receives the first and second control packets from the control communication pathway and the data packet from the data communication pathway and separates the first control packet to said first error check circuit and the second control packet and the data packet to said second error check circuit.

5. The packet communication control device according to claim 1, wherein said arbitration control circuit, when a compete between the arbitration results of the first and second arbitration circuits occurs, selects one of said sending units to execute a transfer according to the arbitration result of said second arbitration circuit when the data communication pathway is not occupied and selects one of said sending units to execute a transfer according to the arbitration result of said first arbitration circuit when the data communication pathway is occupied.

6. The packet communication control device according to claim 1, wherein said first control packet comprises a data reception request and said second control packet comprises a data transmission request.

7. The packet communication control device according to claim 1, wherein said arbitration control circuit receives a sending request from the sending units, judges whether the sending request is the first control packet or the second control packet and selects the first arbitration circuit the second arbitration circuit to arbitrate the sending request.

8. The packet communication control device according to claim 1, wherein each of said plurality of sending units comprises a FIFO (First In First Out) unit that receives, stores the first control packet, the second control packet and the data packet from a sending requestor and performs first-in first-out operation.

9. A memory access control device that requests a memory access controller to access a memory by transferring a first control packet having control information when transferring the control information and transferring a second control packet having the control information and a data packet having data when the data is attached to the control information to the memory access controller, comprises:
a plurality of sending units;
a multiplexer that selects an output of the sending units; and
a multiplex control circuit that controls the transfer operation of the of plurality of sending unit, the multiplexer control circuit including
a first arbitration circuit that arbitrates a first control packet of said sending units;
a second arbitration circuit that arbitrates a second control packet of said sending units; and
an arbitration control circuit that selects one of said sending units to simultaneously transfer the second control packet to a control communication pathway and the data packet attached to the second control packet to a data communication pathway according to an arbitration result of said second arbitration circuit and selects one of said sending units to transfer the first control packet to the control communication pathway during transferring of the data packet to the data communication pathway according to another arbitration result of said first arbitration circuit.

10. The memory access control device according to claim 9, further comprises a packet reception circuit that receives the first and second control packets from the control communication pathway and the data packet from the data communication pathway,
wherein said packet reception circuit comprises:
a first error check circuit that checks an error of the first control packet from the control communication pathway;
a second error check circuit that checks an error of the second control packet and the data packet; and
a timing adjustment circuit that adjusts a timing between the first control packet that the first error check circuit have not detected the error and the second control packet that the second error check circuit have not detected the error.

11. The memory access control device according to claim 10, wherein said timing adjustment circuit comprises:
a delay circuit that delays the first control packet that the first error check circuit have not detected the error; and
a multiplexer that selects either one of delayed said first control packet and said first control packet that did not delayed by a timing of the second control packet that the second error check circuit have not detected the error.

12. The memory access control device according to claim 10, wherein said packet reception circuit further comprises a separating circuit that receives the first and second control packets from the control communication pathway and the data packet from the data communication pathway and separates the first control packet to said first error check circuit and the second control packet and the data packet to said second error check circuit.

13. The memory access control device according to claim 9, wherein said arbitration control circuit, when a compete between the arbitration results of the first and second arbitration circuits occurs, selects said sending unit to execute a transfer according to the arbitration result of said second arbitration circuit when the data communication pathway is not occupied and selects said sending unit to execute a transfer according to the arbitration result of said first arbitration circuit when the data communication pathway is occupied.

14. An information processing system comprises:
an arithmetic processing device;
a memory;
a memory access controller that accesses the memory; and
a memory access execution device that requests the memory access controller to access the memory by transferring a first control packet having control information when transferring the control information and a second control packet having the control information and a data packet having data when the data is attached to the control information, according to a command executed by the arithmetic processing device, said memory access execution device including
a plurality of sending units;
a multiplexer that selects an output of the sending units; and
a multiplex control circuit that controls the transfer operation of the of plurality of sending unit, the multiplexer control circuit including
a first arbitration circuit that arbitrates a first control packet of said sending units;
a second arbitration circuit that arbitrates a second control packet of said sending units; and
an arbitration control circuit that selects one of said sending units to simultaneously transfer the second control packet to a control communication pathway and the data packet attached to the second control packet to a data communication pathway according to an arbitration result of said second arbitration circuit and selects one of said sending units to transfer the first control packet to the control communication pathway during transferring of the data packet to the data communication pathway according to another arbitration result of said first arbitration circuit.

15. The information processing system according to claim 14, wherein said memory access execution device further comprises a packet reception circuit that receives the first and second control packets from the control communication pathway and the data packet from the data communication pathway, said packet reception circuit including
a first error check circuit that checks an error of the first control packet from the control communication pathway;
a second error check circuit that checks an error of the second control packet and the data packet; and a timing adjustment circuit that adjusts a timing between the first control packet that the first error check circuit have not detected the error and the second control packet that the second error check circuit have not detected the error.

* * * * *

UNITED STATES PATENT AND TRADEMARK OFFICE
CERTIFICATE OF CORRECTION

PATENT NO. : 8,472,474 B2
APPLICATION NO. : 12/967597
DATED : June 25, 2013
INVENTOR(S) : Takashi Toyoshima Page 1 of 1

It is certified that error appears in the above-identified patent and that said Letters Patent is hereby corrected as shown below:

In the Claims

Column 15, Line 12, In Claim 7, before "the second" insert -- or --.

Column 16, Line 39, In Claim 14, before "plurality" delete "of".

Column 16, Line 39, In Claim 14, delete "unit" and insert -- units --, therefor.

Signed and Sealed this
Twenty-fourth Day of September, 2013

Teresa Stanek Rea
*Deputy Director of the United States Patent and Trademark Office*